(12) United States Patent
Ketterhagen et al.

(10) Patent No.: US 8,533,818 B1
(45) Date of Patent: Sep. 10, 2013

(54) PROFILING BACKUP ACTIVITY

(75) Inventors: Thomas R. Ketterhagen, Georgetown, TX (US); Alfred C. Hartmann, Round Rock, TX (US)

(73) Assignee: Symantec Corporation, Mountain View, CA (US)

( * ) Notice: Subject to any disclaimer, the term of this patent is extended or adjusted under 35 U.S.C. 154(b) by 1139 days.

(21) Appl. No.: 11/479,921

(22) Filed: Jun. 30, 2006

(51) Int. Cl.
| G06F 11/00 | (2006.01) |
| G06F 12/14 | (2006.01) |
| G06F 12/16 | (2006.01) |
| G06F 7/04 | (2006.01) |
| G06F 17/30 | (2006.01) |
| G08B 23/00 | (2006.01) |

(52) U.S. Cl.
USPC .............. 726/22; 726/23; 726/24; 726/26

(58) Field of Classification Search
USPC ... 726/1–7, 10, 14, 21, 22–33; 713/182–185; 380/59
See application file for complete search history.

(56) References Cited

U.S. PATENT DOCUMENTS

| 6,792,543 B2 * | 9/2004 | Pak et al. ...................... 726/24 |
| 6,907,436 B2 * | 6/2005 | Ye et al. ............................ 1/1 |
| 7,007,301 B2 * | 2/2006 | Crosbie et al. .................. 726/23 |
| 7,155,745 B1 * | 12/2006 | Shin et al. ....................... 726/27 |
| 7,322,047 B2 * | 1/2008 | Redlich et al. .................. 726/27 |
| 7,523,155 B2 * | 4/2009 | Hayes, Jr. ....................... 709/200 |
| 7,526,810 B2 * | 4/2009 | Lalonde et al. ................. 726/24 |
| 7,546,353 B2 * | 6/2009 | Hesselink et al. ............. 709/216 |
| 7,730,538 B2 * | 6/2010 | Fries et al. ...................... 726/24 |
| 2002/0066034 A1 * | 5/2002 | Schlossberg et al. .......... 713/201 |
| 2002/0095598 A1 * | 7/2002 | Camble et al. ................. 713/200 |
| 2003/0120949 A1 * | 6/2003 | Redlich et al. ................. 713/200 |
| 2003/0163351 A1 * | 8/2003 | Brown et al. ...................... 705/2 |
| 2004/0030912 A1 * | 2/2004 | Merkle et al. .................. 713/200 |
| 2005/0060579 A1 * | 3/2005 | Dickelman et al. ............ 713/201 |
| 2005/0063005 A1 * | 3/2005 | Phillips et al. ................ 358/1.15 |
| 2005/0138081 A1 * | 6/2005 | Alshab et al. .................. 707/200 |
| 2005/0210041 A1 * | 9/2005 | Taguchi ......................... 707/100 |
| 2006/0100912 A1 * | 5/2006 | Kumar et al. ...................... 705/4 |
| 2007/0100913 A1 * | 5/2007 | Sumner et al. ................. 707/204 |
| 2007/0271189 A1 * | 11/2007 | Morten et al. .................. 705/57 |
| 2008/0040790 A1 * | 2/2008 | Kuo ............................... 726/12 |

* cited by examiner

*Primary Examiner* — Edan Orgad
*Assistant Examiner* — Jahangir Kabir
(74) *Attorney, Agent, or Firm* — Wilmer Cutler Pickering Hale and Dorr LLP

(57) ABSTRACT

Mitigating a network security threat is disclosed. Information associated with a data protection event is received. The received information is evaluated for an indication of a network security threat. One or more remedial actions are performed if it is determined that a potential threat has been indicated. Optionally, the received information is stored.

15 Claims, 3 Drawing Sheets

US 8,533,818 B1

PROFILING BACKUP ACTIVITY

BACKGROUND OF THE INVENTION

Administrators typically rely on systems such as intrusion detection systems (IDS), network intrusion prevention systems (IPS), and other devices, such as firewalls (collectively referred to herein as "security appliances") to detect and prevent threats to their network assets. For example, a firewall can be configured to detect a flood of SYN messages—an indication that a denial of service or other attack is underway—and take one or more appropriate actions.

Unfortunately, certain attacks may successfully evade security appliances, potentially resulting in a significant amount of damage and/or loss of resources. For example, a newly created worm may spread substantially during the time in which it takes a security appliance vendor to write and propagate rules for detecting the worm. In some cases, threats may evade detection by being sufficiently narrow in scope (e.g., targeted at a particular subnet, a particular operating system version, etc.), perhaps not supported by the security appliance vendor. Other circumstances, such as employees not applying patches in a timely manner, can also pose security problems.

Therefore, it would be desirable to have a better way to detect and remediate security threats.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
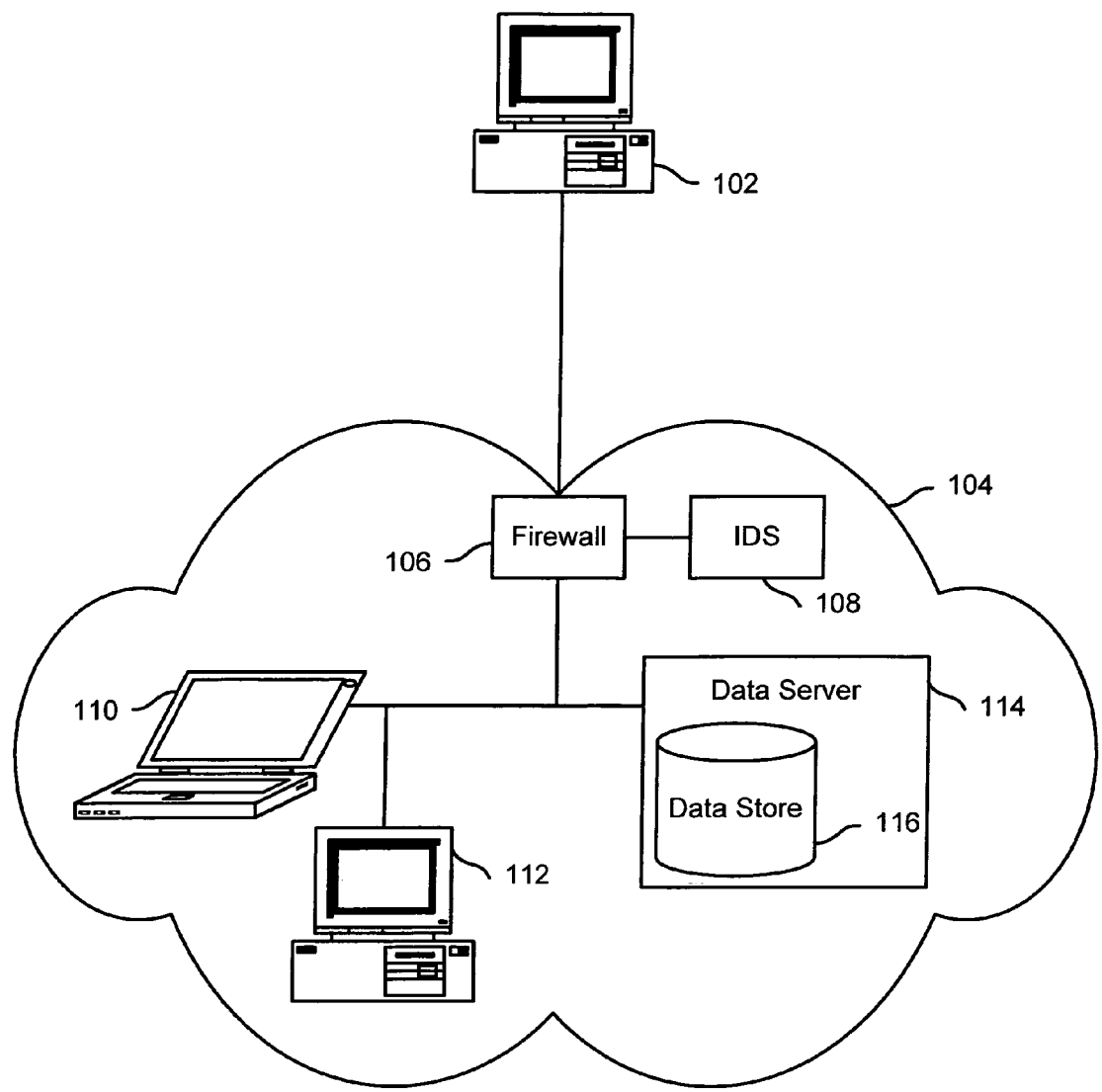
FIG. 1 illustrates an embodiment of an environment in which data protection is deployed.

FIG. 1 illustrates an embodiment of an environment in which data protection is deployed. Various hosts, including client 110 and client 112 are networked via network 104. In the example shown, network 104 is an enterprise network and includes a variety of security appliances such as firewall 106 and intrusion detection system (IDS) 108 to help protect nodes (e.g., clients 110 and 112 and server 114) from threats such as malicious activity conducted by attacker 102.

Also included on network 104 is a data protection server 114. In the example shown, data protection server 114 supports continuous data protection (CDP) features. In a CDP model, whenever a user causes modifications on a managed endpoint, those changes are reflected in a data store 116 maintained by data protection server 114. The information stored on data protection server 114 includes in some embodiments changes made to nodes across enterprise network 104 over time, as well as metadata associated with all of those changes. Data protection server 114 thus includes effectively real-time intelligence on the sequence of changes made to all of the managed endpoints in network 104.

For example, as a user edits a document on client 110, changes made by the user are also stored in data store 116. Meta information associated with the logged change, such as a create time, modification time, checksum, permissions, ownership, etc., is also stored on data protection server 114 in an activity profile. Each reflection on data protection server 114 of a change made on an endpoint is referred to herein as a "data protection event" or a "backup event," interchangeably.

Mining backup data, such as information stored on a data protection server such as server 114, for anomalies indicative of malicious behavior is disclosed. In some embodiments, remedial actions are taken as appropriate.

In some embodiments, data protection server 114 supports near continuous data protection (NCDP) and snapshots of changes are taken on a frequent basis (e.g., hourly), rather than as they occur. Metadata associated with the changes recorded in an NCDP model are similarly stored on a periodic basis and can be mined in a similar manner.

In some embodiments, data protection server 114 is a traditional backup server. While less meta information will typically be captured during the backup process (for example by virtue of backups generally being less frequent and less granular in a traditional backup scenario than in a CDP or NCDP scenario), agents, such as a backup agent residing on client 110, in some embodiments are configured to collect and/or augment information associated with the backup to data protection server 114 and the techniques described herein can be adapted as appropriate.

In the example shown in FIG. 1, data protection server 114 is implemented as a single server with a single data store 116. Both changes and meta information associated with those changes are maintained in data store 116. In various embodiments, the infrastructure provided by portions of data protection server 114 is located on and/or replicated across a plurality of servers rather than the entirety of data protection server 114 being collocated on a single platform. Such may be the case, for example, if the contents of data store 116 are vast and/or there are many endpoints in network 104. Similarly, in some embodiments, changes are maintained in one data store, while meta information associated with those changes are maintained in one or more additional data stores (not shown). In some embodiments, changes and/or associated metadata are or may be stored on a client system at which the change was made, e.g., in a separate partition on a storage device and/or volume on which the document is stored.

While data protection server 114 is shown as a node in enterprise network 104, in some embodiments, an endpoint such as client 110 is located on a network different from the one on which the data protection server is located. For example, in some embodiments, client 110 is a consumer laptop connected to the Internet and data protection server 114 provides web-based backup services.

Figure 2:
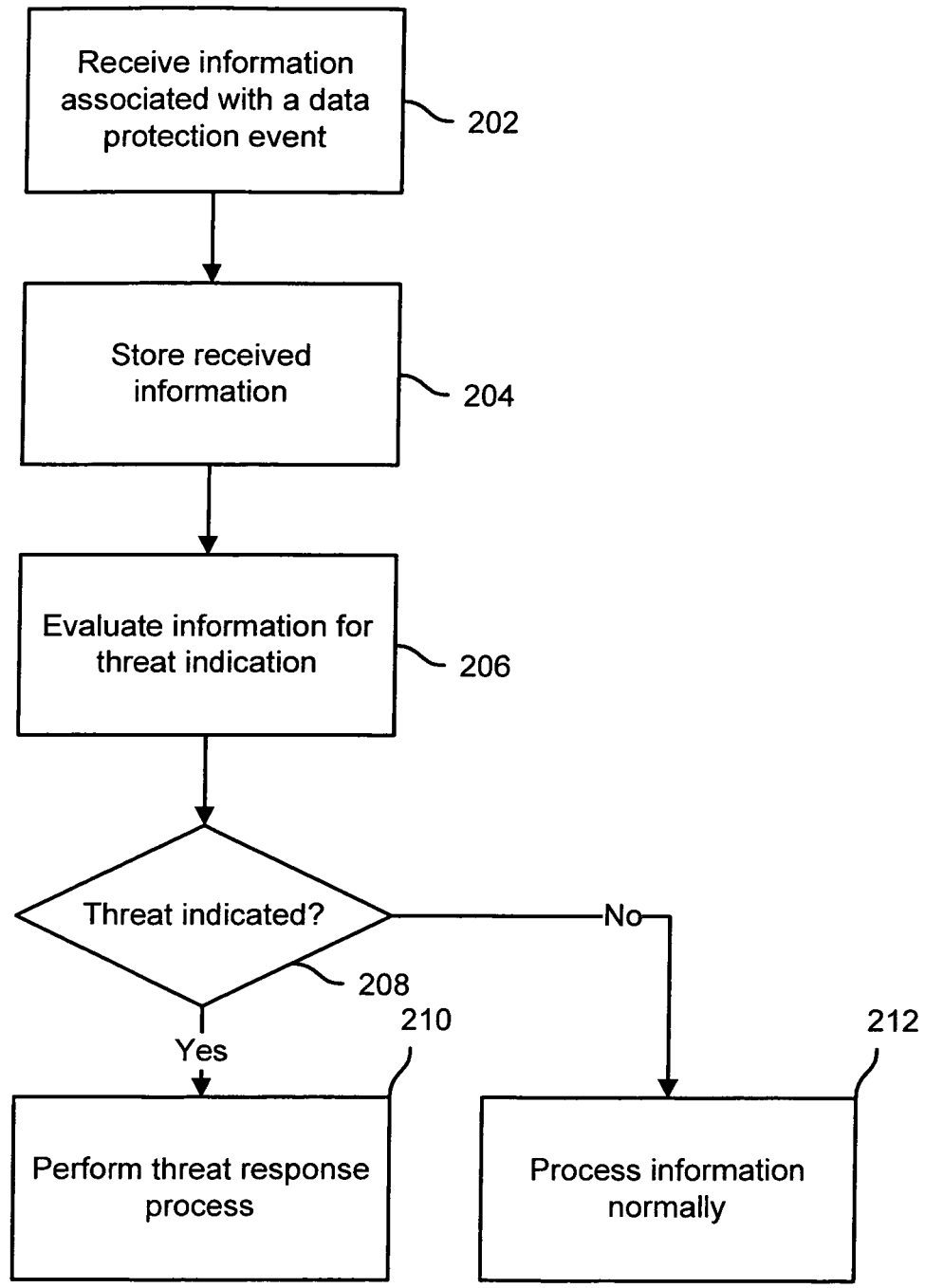
FIG. 2 is a flow chart illustrating an embodiment of a process for detecting and responding to a threat.

FIG. 2 is a flow chart illustrating an embodiment of a process for detecting and responding to a threat. This process is implemented in some embodiments on data protection server 114. The process begins at 202 when information associated with a data protection event is received. Suppose, for example, that a user makes a change to a file on client 110. At 202, information associated with the change is received by data protection server 114.

In some embodiments, at least a portion of the information received at 202 is received from an agent. For example, if data protection server 114 is based on a traditional backup model, rather than on a CDP or NCDP model, in some embodiments a backup agent running on a client on which the data to be backed up resides collects meta information about the data to be backed up and the information received at 202 includes that agent-collected meta information.

An agent running on the client is used in CDP and NCDP backup models in some embodiments to help provide more comprehensive information to data protection server 114. In some embodiments, a client-based agent primarily resident for a purpose other than assisting in the backup of data provides the information received at 202. For example, the agent may record other environmental information such as when software is installed; when processes start and stop; memory, socket, and port usage; master boot record, partition boot records, and other volume manager metadata stored on disk; and file system metadata such as used space, free space, and total space. Such non-backup agents can be extended to provide information to data protection server 114 as applicable. Additionally, changes to hidden information not typically monitored by traditional security appliances and software, such as block level activity (NTFS reparse points), are monitored for and communicated to data protection server 114 in some embodiments. Such information can be used, e.g., by data protection server 114 to detect, for example, rootkit infections.

In some embodiments, the information received at 202 varies based on one or more triggers. For example, if a particular circumstance or set of circumstances is observed (e.g., a particular file is modified), one or more agents can be configured to provide supplemental information not typically captured as meta information for backup purpose, such as portions of memory.

Optionally, at 204, at least a portion of the meta information received at 202 is stored. The stored information is used in various embodiments to correlate data protection events across endpoints and/or to detecting trends or patterns of activity. In some embodiments, only real time threat checking (such as whether a particular named file has been modified) is performed and portion 204 of the process shown in FIG. 2 is omitted as applicable.

At 206, it is determined whether the information received at 202 indicates a threat. Data store 116 in some embodiments is mined to provide a variety of threat indications, including pre-zero day attack detection and security episode alerting, as well as to make defensive lockdowns, and targeted remediation. The backup activity, characterized by the meta information received at 202, is correlated, and the contents of modified files are available for analysis as necessary.

One example of a threat indication is a change to a known system library, executable, or other sensitive file, a file in a particular directory (such as a system directory), and/or a file that is not normally modified, such as the IERESET.INF file on a single Microsoft Windows XP client. Any such modifications can be analyzed (e.g., by comparing the previously stored version of the file and the currently modified version of the file). Cookie files and other file traces of internet activity can similarly be analyzed for suspicious patterns. And, the creation of new files in protected directories can also indicate a threat.

Another example of a threat indication is an unexpected change in the size of the modification—another factor which can be included in and/or derived from backup-related meta information. For example, certain files are normally updated with very small amounts of additional data or are modified with a handful of small changes. If such a file is modified (and associated) with an atypically large write or a large truncation, a threat may be indicated.

In some cases, the lack of modification of a file indicates a security threat. For example, suppose new antivirus definitions are propagated to clients once a week. As the files are propagated, they are backed up by the clients with data protection server 114. If a particular client does not back up the new antivirus definition, that can indicate that it did not receive the antivirus definition. Similarly, when an administrator schedules and executes upgrades, such as upgrades of applications and/or operating system service packs, if a client does not report the change to data protection server 114, a threat may be indicated. In such cases, the threat indicated is potentially not an indication of an outside threat such as from attacker 102, but instead an indication of a violation of or failure to adhere to a security policy.

In various embodiments, combinations of indicators, statistical information across hosts, and/or learning techniques are used at least in part in the analysis performed at 206.

In some embodiments, all changes to an endpoint are classified as either approved or suspicious by data protection server 114. In some embodiments, scheduled changes to endpoints are considered approved and all other changes are considered suspect until proven otherwise. For example, suppose an administrator approves an update of all versions of an application from version 4.0 to 5.0. Since the delta of this update—the files that are added or modified—is known, the related changes are considered safe. Conversely, suppose the administrator did not approve any networking updates and all endpoints are at a known and approved network patch level. If the file wsock32.dll gets updated on one endpoint, it will be immediately flagged as suspicious, warranting further investigation to determine whether the modification is malicious or merely unapproved. Once a non-approved change is analyzed and considered safe then in some embodiments it is classified as "approved" for other endpoints.

If it is determined (at 208) that a threat is indicated, at 210 one or more remedial responses is taken. Example of remedial responses include responses typically taken in conjunction with threats detected by conventional security appliances and alerts issued by data protection server 114 to an administrator console. The contents and the formatting of the alert may depend on a variety of factors, including the type of threat indicated and the platform(s) on which the threat was indicated. In some embodiments, data protection server 114 is configured to convey detected suspicious activity to conventional security appliances such as IDS 108 which can in turn generate the appropriate alerts and/or cause the appropriate remedial actions to occur such as isolating or restricting a suspicious endpoint to accessing only certain subnets and/or forcing the (re)initiation network admission control (NAC) procedures.

Conventional security appliances can be configured to alert backup server 114 of observed attack activity known to corrupt or create certain files so that the backup analysis can be sensitized to such changes. In the case of non-CDP data protection servers, actions such as scheduling backups more frequently in cases of suspicious activity can also be performed at 210. If no threat is indicated, the information received at 202 is processed (such as by storing it in data store 116) in the typical manner at 212.

In some embodiments, at 210, backup activity is used post-mortem to determine the behavior pattern of an attack. For example, suppose client 112 is compromised due to malicious code. At 210, the backup activity sequence(s) leading to the point of failure can be analyzed to determine the course the malicious attack took—which files were modified, etc. Any patterns discovered in the course of the post-mortem analysis can be included in evaluations performed at 206. Any additional environmental information collected, such as through agents, can also be analyzed post-mortem.

Figure 3:
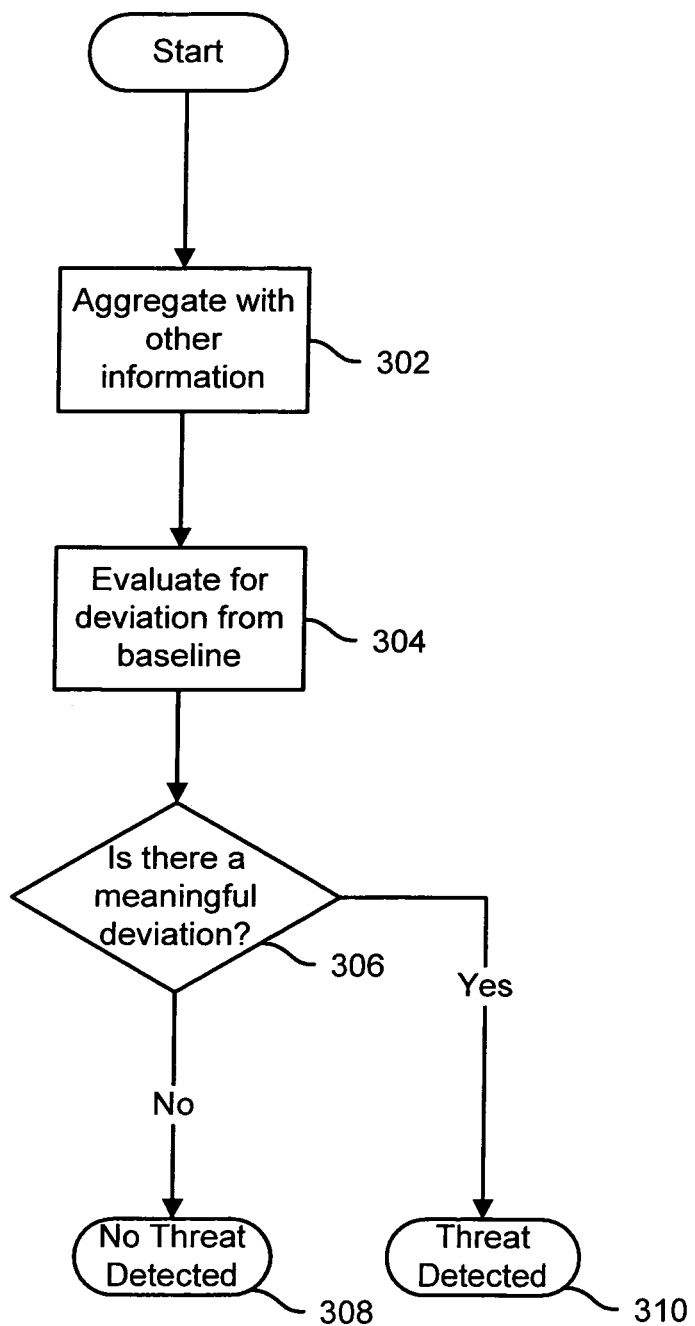
FIG. 3 is a flow chart illustrating an embodiment of a process for detecting a threat through statistical analysis.

FIG. 3 is a flow chart illustrating an embodiment of a process for detecting a threat through statistical analysis. The process of FIG. 3 can be used as the threat detection portion of the process depicted in FIG. 2 at 206.

Suppose only accepted, expected modifications and related information is initially collected at 202 and stored at 204. In some embodiments this statistical information is aggregated, such as at 302, to form a baseline of reasonable data protection behavior which can be used in the analysis of subsequently received data protection events. At 304, new data protection events are analyzed by data protection server 114 and compared against the baseline. At 306, it is determined whether the new data protection event deviates in a meaningful way from the baseline. If anomalous backup activity is detected, it is determined (306) that a meaningful deviation has been found and it is concluded at 310 that a threat has been detected, and processing, such as the remedial actions described in conjunction with portion 210 of FIG. 2 is taken as appropriate.

If no meaningful deviation is found, it is concluded at 308 that no threat has been detected and typical processing, such as that described in conjunction with portion 212 of FIG. 2, is performed as appropriate.

One example of the analysis performed at 306 is the correlation of backup activity across all endpoints. For example, if hundreds of endpoints perform a backup of a newly created file named mblast.exe at approximately the same time, the file is a candidate malicious file, such as a propagating worm, and is detected at 306 accordingly. Similarly, the modification of an existing file such as wsock32.dll across several endpoints during the course of an hour may indicate a threat. Information such as that nodes which typically perform data protection events infrequently are suddenly making changes can be stored as part of the baseline and used to threshold the analysis. For example, many nodes may simultaneously edit files under default names such as "document.doc." If some of those nodes include platforms for which no document editor exists, or nodes on which documents are never edited, a threat may nonetheless be indicated. The particular implementation of the process depicted in FIG. 3 can vary and the specific techniques implemented can depend on different platforms as appropriate.

In some embodiments, the determination made at 206 is based at least in part on policies defined by a system administrator. For example, such a determination may be made based on such factors as the identity of a particular endpoint (e.g., whether it is an employee laptop or a quality assurance machine), a priority or threat level associated with the threat, the criticality of the endpoint, and other considerations of what might happen if a detected threat is not quarantined aggressively.

In some embodiments, a combination of factors (meta information) is taken into account when determining whether a threat is indicated. For example, if new files are created on several different nodes with different (perhaps randomly generated) names, but similar file sizes and permissions, an evasive threat may be indicated.

In some cases, innocuous and/or desirable changes may be falsely detected as a threat. Such may be the case, for example, with a planned system upgrade or patch being applied. Occurrences of false positives can be minimized, e.g., by an administrator white listing files or otherwise modifying the baseline.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for mitigating a network security threat comprising:

receiving at a first device, from a backup agent on a client device, backup metadata associated with a data protection event, wherein the received backup metadata is indicative of a change in data of the client device to be backed up, and wherein the first device is configured to receive metadata separate from client backup data;

storing at the first device backup metadata, wherein the backup metadata is stored in a memory location separate from client backup data;

evaluating, using a processor of the first device, the received backup metadata for an indication of a network security threat at the client device, wherein evaluating the received backup metadata for an indication of a network security threat at the client device includes at least one of: determining whether a host is making more frequent changes to data, wherein the host has previously made less frequent changes to data; detecting an absence of an expected indication of a modification in the received backup metadata; identifying based on backup metadata from a plurality of client devices an indication of copies of an identical file created within a specified period of time; an expected change in a size of a file modification; a modification to a file not expected to be modified; identifying based on backup metadata from a plurality of client devices a modification to a same file across several client devices; determining that a current backup activity deviates by more than a threshold amount from a corresponding previously-observed backup activity; and determining that a host that in the past has made only few changes to data has begun to make more frequent changes to data; and performing one or more remedial actions if a network security threat is detected.

2. The method of claim 1 further comprising storing the received backup metadata.

3. The method of claim 2 further comprising aggregating the received backup metadata with previously stored backup metadata.

4. The method of claim 1 further comprising issuing an alert if a network security threat is detected.

5. The method of claim 4 wherein the alert is issued to at least one of: an administrator and a security appliance.

6. The method of claim 1 wherein evaluating the received backup metadata includes evaluating for a pattern of backup activity.

7. The method of claim 1 wherein evaluating the received backup metadata includes evaluating metadata received from a plurality of sources.

8. The method of claim 1 wherein evaluating the received backup metadata includes concluding with respect to a first host that an observed change to data is not a network security threat and determining based at least in part on the conclusion reached with respect to the first host that a corresponding observed change to corresponding data on a second host is not a network security threat.

9. The method of claim 1 wherein the data protection event comprises at least one of: a continuous data protection event and a near continuous data protection event.

10. The method of claim 1 wherein the data protection event is a traditional backup event.

11. A system for mitigating a network security threat, including:
a processor; and
a memory coupled with the processor, wherein the memory is configured to provide the processor with instructions which when executed cause the processor to:
receive at a first device, from a backup agent on a client device, backup metadata associated with a data protection event, wherein the received backup metadata is indicative of a change in data of the client device to be backed up, and wherein the first device is configured to receive metadata separate from client backup data;
store at the first device backup metadata, wherein the backup metadata is stored in a memory location separate from client backup data;
evaluate, at the first device, the received backup metadata for an indication of a network security threat at the client device, wherein evaluating the received backup metadata for an indication of a network security threat at the client device includes at least one of: determining whether a host is making more frequent changes to data, wherein the host has previously made less frequent changes to data; detecting an absence of an expected indication of a modification in the received backup metadata; identifying based on backup metadata from a plurality of client devices an indication of copies of an identical file created within a specified period of time; an expected change in a size of a file modification; a modification to a file not expected to be modified; identifying based on backup metadata from a plurality of client devices a modification to a same file across several client devices; determining that a current backup activity deviates by more than a threshold amount from a corresponding previously-observed backup activity; and determining that a host that in the past has made only few changes to data has begun to make more frequent changes to data; and
perform one or more remedial actions if a network security threat is detected.

12. The system of claim 11 wherein the memory is further configured to provide the processor with instructions which when executed cause the processor to store the received backup metadata.

13. The system of claim 12 wherein the memory is further configured to provide the processor with instructions which when executed cause the processor to aggregate the received backup metadata with previously stored backup metadata.

14. The system of claim 11 wherein evaluating the received backup metadata includes concluding with respect to a first host that an observed change to data is not a network security threat and determining based at least in part on the conclusion reached with respect to the first host that a corresponding observed change to corresponding data on a second host is not a network security threat.

15. A non-transitory computer readable storage medium having embodied thereon computer instructions which when executed by a computer cause the computer to perform a method comprising:
receiving at a first device, from a backup agent on a client device, backup metadata associated with a data protection event, wherein the received backup metadata is indicative of a change in data of the client device to be backed up, and wherein the first device is configured to receive metadata separate from client backup data;
storing at the first device backup metadata, wherein the backup metadata is stored in a memory location separate from client backup data;
evaluating, at the first device, the received backup metadata for an indication of a network security threat on the client device, wherein evaluating the received backup metadata for an indication of a network security threat at the client device includes at least one of: determining whether a host is making more frequent changes to data, wherein the host has previously made less frequent changes to data; detecting an absence of an expected indication of a modification in the received backup metadata; identifying based on backup metadata from a plurality of client devices an indication of copies of an identical file created within a specified period of time; an expected change in a size of a file modification; a modification to a file not expected to be modified; identifying based on backup metadata from a plurality of client devices a modification to a same file across several client devices; determining that a current backup activity deviates by more than a threshold amount from a corresponding previously-observed backup activity; and determining that a host that in the past has made only few changes to data has begun to make more frequent changes to data; and
performing one or more remedial actions if a network security threat is detected.

* * * * *